(12) United States Patent
Turner

(10) Patent No.: US 9,889,950 B2
(45) Date of Patent: Feb. 13, 2018

(54) SPACECRAFT WITH AERODYNAMIC CONTROL

(71) Applicant: Space Systems/Loral, LLC, Palo Alto, CA (US)

(72) Inventor: Andrew E. Turner, Mountain View, CA (US)

(73) Assignee: Space Systems/Loral, LLC, Palo Alto, CA (US)

( * ) Notice: Subject to any disclaimer, the term of this patent is extended or adjusted under 35 U.S.C. 154(b) by 458 days.

(21) Appl. No.: 14/627,936

(22) Filed: Feb. 20, 2015

(65) Prior Publication Data
US 2016/0244189 A1 Aug. 25, 2016

(51) Int. Cl.
| | |
|---|---|
| *B64G 1/24* | (2006.01) |
| *B64G 1/44* | (2006.01) |
| *B64G 1/50* | (2006.01) |
| B64G 1/10 | (2006.01) |
| B64G 1/22 | (2006.01) |
| B64G 1/64 | (2006.01) |

(52) U.S. Cl.
CPC .............. *B64G 1/24* (2013.01); *B64G 1/1085* (2013.01); *B64G 1/242* (2013.01); *B64G 1/44* (2013.01); *B64G 1/503* (2013.01); *B64G 1/1007* (2013.01); *B64G 1/1021* (2013.01); *B64G 1/222* (2013.01); *B64G 2001/643* (2013.01)

(58) Field of Classification Search
CPC .................................................... B64G 1/407
See application file for complete search history.

(56) References Cited

U.S. PATENT DOCUMENTS

| | | | |
|---|---|---|---|
| 3,576,298 A | | 4/1971 | Barnett et al. |
| 4,426,052 A | * | 1/1984 | Hubert .................. B64G 1/407 |
| | | | 136/292 |
| 5,716,031 A | * | 2/1998 | Duchon .................. B64G 1/24 |
| | | | 244/158.7 |

(Continued)

OTHER PUBLICATIONS

Dell'Elce et al., "Robust optimal rendezvous using differential drag," American Institute of Aeronautics and Astronautics, 2014, 19 pages.

(Continued)

*Primary Examiner* — Brian M O'Hara
(74) *Attorney, Agent, or Firm* — Weaver Austin Villeneuve & Sampson LLP

(57) ABSTRACT

A spacecraft operating in a low earth orbit having an altitude in the range of 160 to 800 km has a main body that includes heat dissipating electrical equipment and an earth-facing payload. Control surfaces on the spacecraft are articulated so as to: provide three-axis attitude control to the spacecraft main body using aerodynamic drag effects, such that the earth-facing payload is maintained in a selected orientation with respect to the earth; and control one or both of orbit altitude and period by articulating the control surfaces so as to regulate an amount of aerodynamic drag. The control surfaces include a first control surface disposed, in an on-orbit configuration, on a boom, the boom being mechanically coupled with the main body, and with one or both of a solar array electrically coupled with the electrical equipment and a thermal radiating array thermally coupled with the electrical equipment.

16 Claims, 9 Drawing Sheets

(56) References Cited

U.S. PATENT DOCUMENTS

| | | | |
|---|---|---|---|
| 5,806,801 A * | 9/1998 | Steffy | B64G 1/1085 244/158.6 |
| 6,102,339 A | 8/2000 | Wu et al. | |
| 6,830,222 B1 * | 12/2004 | Nock | B64G 1/242 244/110 D |
| 2004/0117074 A1 | 6/2004 | Wang et al. | |
| 2005/0211828 A1 * | 9/2005 | Gloyer | B64G 1/007 244/51 |
| 2010/0276547 A1 * | 11/2010 | Rubenchik | B64G 1/222 244/172.8 |
| 2015/0217876 A1 * | 8/2015 | Halsband | B64G 1/10 244/172.6 |

OTHER PUBLICATIONS

Li et al., "Optimal Utility of Satellite Constellation Separation with Differential Drag," SPACE Conference & amp; Exposition, Aug. 4-7, 2014, San Diego, CA, AIAA/AAS Astrodynamics Specialist Conference, AIAA 2014-4112, American Institute of Aeronautics and Astronautics, Inc., (Downloaded by Andrew Turner on Aug. 25, 2014 http://arc.aiaa.org, DOI: 10.2514/6.2014-4112) 2014, 10 pages.

Leonard et al., "Orbital Formatkeeping with Differential Drag," 87-2402 (A87-504850, C.S. Draper Lab, Inc., Published by the American Institute of Aeronautics and Astronautics, Inc., with permission, 1987, (Downloaded by SPACE SYSTEMS/LORAL on Nov. 12, 2014 http://arc.aiaa.org, DOI: 10.2514/6.1987-2402, 1987, 11 pages.

Moe et al., "Gas-surface interactions and satellite drag coefficients," Planetary and Space Science, Elsevier, 2004-2005, 9 pages.

NASA, "Spacecraft Aerodynamic Torques," NASA Space Vehicle Design Criteria (Guidance and Control), SP-8058, National Aeronautics and Space Administration, Jan. 1971, 36 pages.

Powell et al., "Evaluation of the Aerodynamic Control of the Space Shuttle Orbiter with Tip-Fin Controllers," AIAA-84/0488, AIAA'84, A84-18122, AIAA 22nd Aerospace Sciences Meeting, Reno, Nevada, (Downloaded by SPACE SYSTEMS/LORAL on Nov. 12, 2014 http://arc.aiaa.org, DOI: 10.2514/6.1984-488), 1984, 13 pages.

Psiaki, M., "Spacecraft Attitude Stabilization Using Passive Aerodynamics and Active Magnetic Torquing," AIAA 2003-5420, AIAA Guidance, Navigation, and Control Conference and Exhibit Aug. 11-14, 2003, Austin, Texas, Published by the American Institute of Aeronautics and Astronautics, Inc., with permission, 2003, 12 pages.

Palmerini et al., "Spacecraft Orbit Control Using Air Drag," IAC-05-C1.6.10, Rome, Italy, (Downloaded by SPACE SYSTEMS/ LORAL on Nov. 12, 2014 http://arc.aiaa.org, DOI: 10.2514/6.IAC-05-C1.6.10), 8 pages.

Rawashdeh et al., "Nano- Satellite Passive Attitude Stabilization Systems Design by Orbital Environment Modeling and Simulation," University of Kentucky, Lexington, KY, 40506, Published by the American Institute of Aeronautics and Astronautics, Inc., with permission, 2010, 15 pages.

Turner et al., "GlobalstarTM Constellation Design and Establishment Experience," AAS/AIAA Astrodynamics Specialists Conference, AIAA, AAS 03-636, American Astronautical Society, 2003, 18 pages.

Guglielmo, et al., "Propellant-less Atmospheric Differential Drag LEO Spacecraft (PADDLES)", Poster Session of the AIAA/USU Conference on Small Satellites, 2014, http://digitalcommons.usu. edu/smallsat/2014/Poster/19/.

* cited by examiner

Detail A

Detail B

SPACECRAFT WITH AERODYNAMIC CONTROL

TECHNICAL FIELD

This invention relates generally to spacecraft and, in particular, to techniques for maintaining three-axis attitude control and regulating an amount of aerodynamic drag, such that long-term operation at a low earth orbit (LEO) altitude in the range of 160 to 800 km can be accommodated with minimal or no expenditure of propellant.

BACKGROUND

The assignee of the present invention manufactures and deploys spacecraft for, inter alia, communications, broadcast and imaging services, more particularly, spacecraft having a nadir facing payload and capable of generating a substantial amount of DC power. One class of orbits of interest for such spacecraft includes Low Earth Orbit (LEO), the term LEO generally being considered to relate to orbits having an altitude between 160 and 2000 km.

Spacecraft in such orbits experience disturbance torques and drag from aerodynamic forces resulting from impingement of atmospheric gas molecules, atoms or other particles on spacecraft surfaces. Aerodynamic forces diminish rapidly as a function of increasing orbital altitude, and are generally no greater than solar radiation forces at altitudes above 800 km. As a result, some spacecraft operators avoid LEO orbits with altitudes below about 800 km. For example, Globalstar spacecraft operate at an altitude of about 1,400 km; as a further example, Iridium spacecraft operate at an altitude of about 780 km. Where spacecraft operating in LEO orbit are required to operate at orbits having an altitude less than 600 km (e.g., the international Space Station at about 400 km) a very appreciable amount of propellant is ordinarily required to offset aerodynamically induced drag forces and torques, so as to maintain a desired orbital altitude and attitude.

Thus, improved techniques for maintaining a desired orbital altitude and attitude are desirable for spacecraft operating in atmospheric conditions typical of LEO orbits having an altitude in the range of 200 to 800 km are desirable.

SUMMARY

The present inventor has appreciated that, for a body stabilized spacecraft with an earth pointing payload, operating at an altitude in the range of 160 to 800 km, three-axis attitude control and a desired orbital position may be maintained over a substantial period of time, even in the absence of propellant, propulsion subsystem equipment, momentum storage equipment, and magnetic torquers, by controlling aerodynamic drag effects.

According to some implementations, a spacecraft is operated in a low earth orbit having an altitude in the range of 160 to 800 km. The spacecraft has a main body that includes heat dissipating electrical equipment and an earth-facing payload. Control surfaces are articulated so as to: provide three-axis attitude control to the spacecraft main body using aerodynamic drag effects, such that the earth-facing payload is maintained in a selected orientation with respect to the earth. One or both of orbit altitude and period are controlled by articulating the control surfaces so as to regulate an amount of aerodynamic drag. The control surfaces include a first control surface disposed, in an on-orbit configuration, on a boom, the boom being mechanically coupled with the main body, and with one or both of a solar array electrically coupled with the electrical equipment and a thermal radiating array thermally coupled with the electrical equipment.

In some examples, the thermal radiating array may be configured to radiate waste heat to space.

In some examples, the spacecraft includes an unmanned communications or observation satellite. The spacecraft may have a power to mass ratio of at least 10 W/kg.

In some examples, the first control surface may be configured to provide a variable amount of pitch torque and the control surfaces may include a second control surface and a third control surface, each of the second control surface and the third control surface being disposed in an on orbit configuration so as to provide a variable amount of one or both of roll and yaw torque. Controlling one or both of orbit altitude and period by articulating the control surfaces may include articulating the second control surface and the third control surface so as to adjust orbital velocity. Articulating the control surfaces may include regulating the amount of aerodynamic drag to be substantially constant.

In some examples, controlling one or both of orbit altitude and period may include deploying a drag chute. The drag chute may be jettisoned or restowed the drag chute.

In some examples, the spacecraft may be configured to exclude propulsion subsystem equipment, momentum storage equipment, and magnetic torquers.

In some examples, the selected orientation may be nadir pointed, a selected angular offset with respect to nadir pointed, or toward a fixed location on the earth.

In some examples, the aerodynamic control surfaces may be configured to regulate drag so as to maintain the spacecraft in a desired position with respect to one or more other spacecraft in a constellation.

In some examples, the control surfaces may be configured to increase drag so as to achieve a deorbiting objective. The deorbiting objective may be to ensure that the spacecraft is deorbited within a selected timeframe.

In some examples, the control surfaces may be configurable to vary the ratio of effective surface area to spacecraft mass within a range from about 0.001 square meters per kilogram to about 0.003 square meters per kilogram.

According to some implementations, a spacecraft includes a main body configured to include, in an on-orbit configuration, heat dissipating equipment and an earth-facing payload, and a plurality of deployable arrays, each deployable array including a respective control surface. The main body is mechanically coupled with the plurality of deployable arrays and, in the on-orbit configuration, articulation of one or both of a first respective control surface and a second respective control surface causes the earth-facing payload to be maintained in a selected orientation with respect to the earth. The control surfaces include a first control surface disposed, in the on-orbit configuration, on a boom, the boom being mechanically coupled with the main body and with one or both of a solar array electrically coupled with the electrical equipment and a thermal radiating array thermally coupled with the electrical equipment.

In some examples, the spacecraft may include an unmanned communications or observation satellite having a power to mass ratio of at least 10 W/kg.

In some examples, the first control surface may be configured to provide a variable amount of pitch torque and the control surfaces may include a second control surface and a third control surface, each of the second control surface and the third control surface being disposed in an on orbit configuration so as to provide a variable amount of roll and/or yaw torque.

In some examples, the spacecraft may be configured to exclude propulsion subsystem equipment, momentum storage equipment, and magnetic torquers.

In some examples, the spacecraft may include a drag chute, the spacecraft being configured for one or more of deploying, jettisoning, and restowing the drag chute.

According to some implementations, a first spacecraft is operated in a first low earth orbit, the first low earth orbit having a first characteristic altitude. A second spacecraft is operated in a second low earth orbit, the second low earth orbit having a second characteristic altitude that is greater than the first characteristic altitude. The second spacecraft is transferred from the second low earth orbit to the first low earth orbit by deploying a drag chute from the second spacecraft, wherein the deploying occurs following a selected period of relative drift between the first spacecraft and the second spacecraft.

In some examples, the drag chute may be jettisoned or restowed.

In some examples, at least one of the first spacecraft and the second spacecraft may include a plurality of deployable arrays, each deployable array including a respective control surface, and a relative position between the first spacecraft and the second spacecraft is controlled by adjusting an angle of attack of the control surfaces such that an amount of aerodynamic drag is incremented upward or decremented downward from an intermediate amount.

BRIEF DESCRIPTION OF THE DRAWINGS

Features of the invention are more fully disclosed in the following detailed description of the preferred embodiments, reference being had to the accompanying drawings, in which like reference numerals designate like structural element, and in which.

Figure 1:
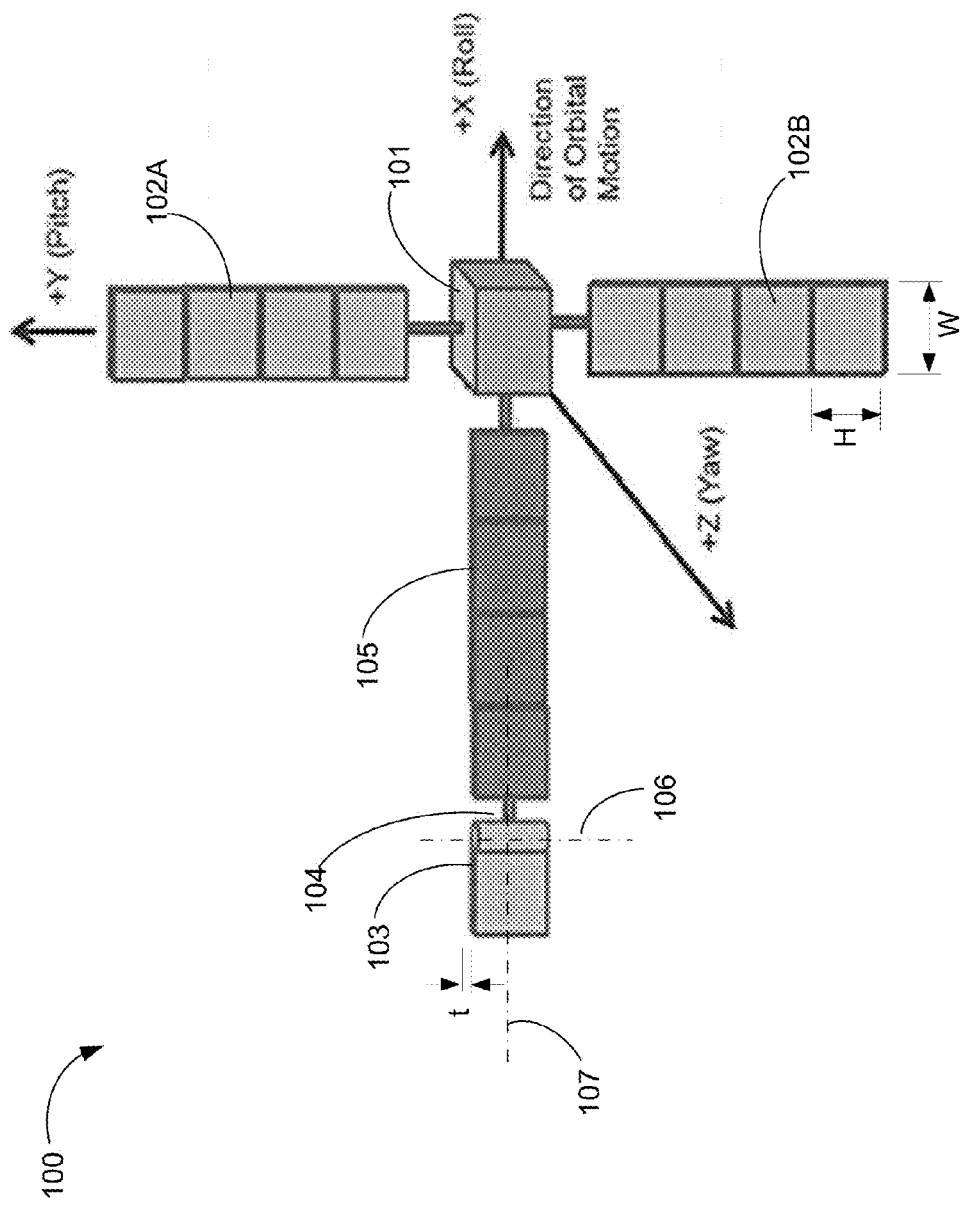
FIG. 1 illustrates a perspective view of a spacecraft in an on-orbit configuration according to an implementation

Throughout the drawings, the same reference numerals and characters, unless otherwise stated, are used to denote like features, elements, components, or portions of the illustrated embodiments. Moreover, while the subject invention will now be described in detail with reference to the drawings, the description is done in connection with the illustrative embodiments. It is intended that changes and modifications can be made to the described embodiments without departing from the true scope and spirit of the subject invention as defined by the appended claims.

DETAILED DESCRIPTION

Specific exemplary embodiments of the invention will now be described with reference to the accompanying drawings. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

The terms "spacecraft", "satellite" and "vehicle" may be used interchangeably herein, and generally refer to any orbiting satellite or spacecraft system.

The presently disclosed techniques permit a spacecraft to maintain three-axis attitude control and to regulate an amount of aerodynamic drag, such that long-term (10-15 years) operation at a LEO altitude in the range of 160 to 800 km can be accommodated with minimal or no expenditure of propellant.

In some implementations, the spacecraft may have a power to mass ratio of ten watts per kilogram or greater, may include a payload requiring at least several hundred watts of DC power. The spacecraft may spacecraft may have a main body that includes heat dissipating electrical equipment and an earth-facing payload. The spacecraft may include one or more deployable solar arrays articulable to be substantially sun pointing irrespective of the orbital position of the spacecraft. In some implementations, the spacecraft may include a deployable thermal radiator.

In some implementations, the spacecraft may be configured as a glider for which three-axis control is maintained using aerodynamic control surfaces. The aerodynamic control surfaces of the spacecraft may enable three-axis attitude control even in the absence of a conventional chemical or electric propulsion subsystem. Advantageously, an attitude control system of the spacecraft may avoid use of propulsion subsystem equipment, momentum storage devices such as reaction or momentum wheels, and magnetic torquers. In some implementations, the aerodynamic control surfaces may be used to regulate drag so as to maintain the spacecraft in a desired position with respect to one or more other spacecraft in a constellation. In some implementations, the control surfaces may be used to increase drag so as to achieve a deorbiting objective. For example, drag may be intentionally increased at or near end of spacecraft life, in order to ensure that the spacecraft is deorbited within a specified timeframe.

The presently disclosed techniques contemplate a satellite operating in an orbital regime for which atmospheric density is low enough to permit long-term spacecraft operation and yet provides aerodynamic forces greater than or equal to the dynamic effects of the pressure of sunlight on the spacecraft. For an earth-orbiting spacecraft, the contemplated range of altitudes is approximately 160 km to 800 km. The presently disclosed techniques may also be used in connection with spacecraft intended to orbit celestial bodies other than the earth.

Within the contemplated orbital regime, random thermal motion of atmospheric molecules, and atoms and particles (hereinafter referred to as 'particles') occurs at velocities that are small compared to the velocity of the spacecraft. For example, the spacecraft speed in a LEO orbit exceeds 7,000 m/s while the speeds of the particles due to thermal motion are typically less than 1,000 m/s.

In such an environment, practically all particles impinging upon the spacecraft are incident from the spacecraft's forward direction and only forces directly opposed to its orbital motion arise from individual particle impacts. Importantly, also, each particle can be treated individually, i.e. no shockwave builds up ahead of the spacecraft due to interparticle interaction and very little pressure is exerted laterally upon the vehicle.

FIG. 1 illustrates a perspective view of the spacecraft in an on-orbit configuration according to an implementation. The spacecraft 100 includes a spacecraft body 101 that is mechanically coupled with a plurality of deployed arrays. Payload equipment including heat dissipating electronics (not illustrated) may be disposed within and/or proximate to the spacecraft body 101. The spacecraft will have a direction of orbital motion in an orbital plane. A roll (+X) axis of the spacecraft 100 is defined as coinciding with the direction of orbital motion. A yaw (+Z) axis is defined as being orthogonal to the X axis and nadir-pointing. A pitch (+Y) axis completes a three-axis Cartesian coordinate system and is orthogonal to the orbital plane. The payload equipment may an earth-facing payload. Part or all of the earth-facing payload may be fixed (i.e., not steerable) with respect to the spacecraft body 101.

In the illustrated implementation, the spacecraft 100 includes aerodynamic control surfaces 102A, 102B and 103. The aerodynamic control surfaces may also be referred to herein as aerodrag arrays. The aerodrag arrays may, in an on-orbit configuration, include one or more planar members having a cross-sectional thickness 't' that is substantially smaller than height 'H' and width 'W' of the planar member. Aerodynamic control surface 103 may be mechanically coupled by way of a boom 104 with a deployed array 105. The deployed array 105 may include a solar array and/or a thermal radiating array. A longitudinal axis 107 of the deployed array 105 may substantially coincide with the spacecraft roll axis. In some implementations, the deployed array 105 may include one or more respectively coplanar panels. The deployed array 105 may be rotatable about the longitudinal axis 107, in order to achieve or maintain a desired attitude with respect to, for example, the sun.

In implementations in which the deployed array 105 includes a solar array (e.g., solar array 105b of FIG. 2), the solar array may be articulable so as to be substantially sun facing. The deployed solar array may be sized and positioned so as to generate substantially more power from sunlight than would be possible if the solar array was fixedly disposed on the body of the spacecraft. For example, in some implementations, the solar array orientation may be rotatable about the longitudinal axis 107 such that a photovoltaic power generating surface of the solar array remains substantially sun facing.

In implementations in which the deployed array 105 includes a thermal radiating array (e.g., thermal radiating array 105a of FIG. 2), the thermal radiating array may be thermally coupled with heat dissipating equipment associated with the spacecraft payload. The heat dissipating equipment (not illustrated) may be disposed within spacecraft body 101. The thermal radiator array may be configured to radiate waste heat from the payload to space. The thermal radiator may be sized and positioned so as to radiate a substantially larger quantity of heat than could be accomplished by radiators fixedly disposed on the body of the spacecraft. For example, the orientation of the thermal radiating array may be adjusted such that it remains substantially edge-on with respect to the sun. As a result, radiating surfaces of the thermal radiating array may absorb minimal heat from the sun.

Advantageously, the deployed array 105 may be configured to have an angle of attack with respect to the spacecraft's direction of motion such that aerodynamic drag is minimized. For example, a deployed array 105 may be configured such that a normal to the array surfaces is substantially orthogonal to the spacecraft's direction of motion. As the spacecraft travels through the atmosphere, surfaces of the deployed array 105 may be configured to maintain a center of aerodynamic pressure downstream of the center of mass to provide passive stability due to aerodynamic forces.

An aft portion of the planar array 105 may be coupled with the boom 104, the boom 104 being in turn structurally coupled with the control surface 103. The control service 103 may be articulable about an axis 106 orthogonal to the spacecraft's direction of motion. In some implementations, the axis 106 may be substantially parallel to the spacecraft pitch axis. Articulating the control surface 103 about the axis 106 may provide a readily controllable amount of pitch torque. In the illustrated implementation, boom 104 is a longitudinal member with a major axis parallel to the spacecraft's direction of motion and the control surface 103 is disposed aft of the deployed array 105 at a distance away from the spacecraft body to increase torque control authority.

Referring still to FIG. 1, in the illustrated limitation, aerodynamic control surface 102A and aerodynamic control surface 102B are coupled with spacecraft body 101 by way of respective arrangements (not illustrated) that permit independent rotation of the respective aerodynamic control surfaces about the pitch axis. As will be described in more detail hereinbelow, such rotation permits an angle of attack of each of the aerodynamic control surface 102A and 102B to be independently adjusted so as to regulate drag forces as well as to control roll torques and yaw torques.

Figure 2:
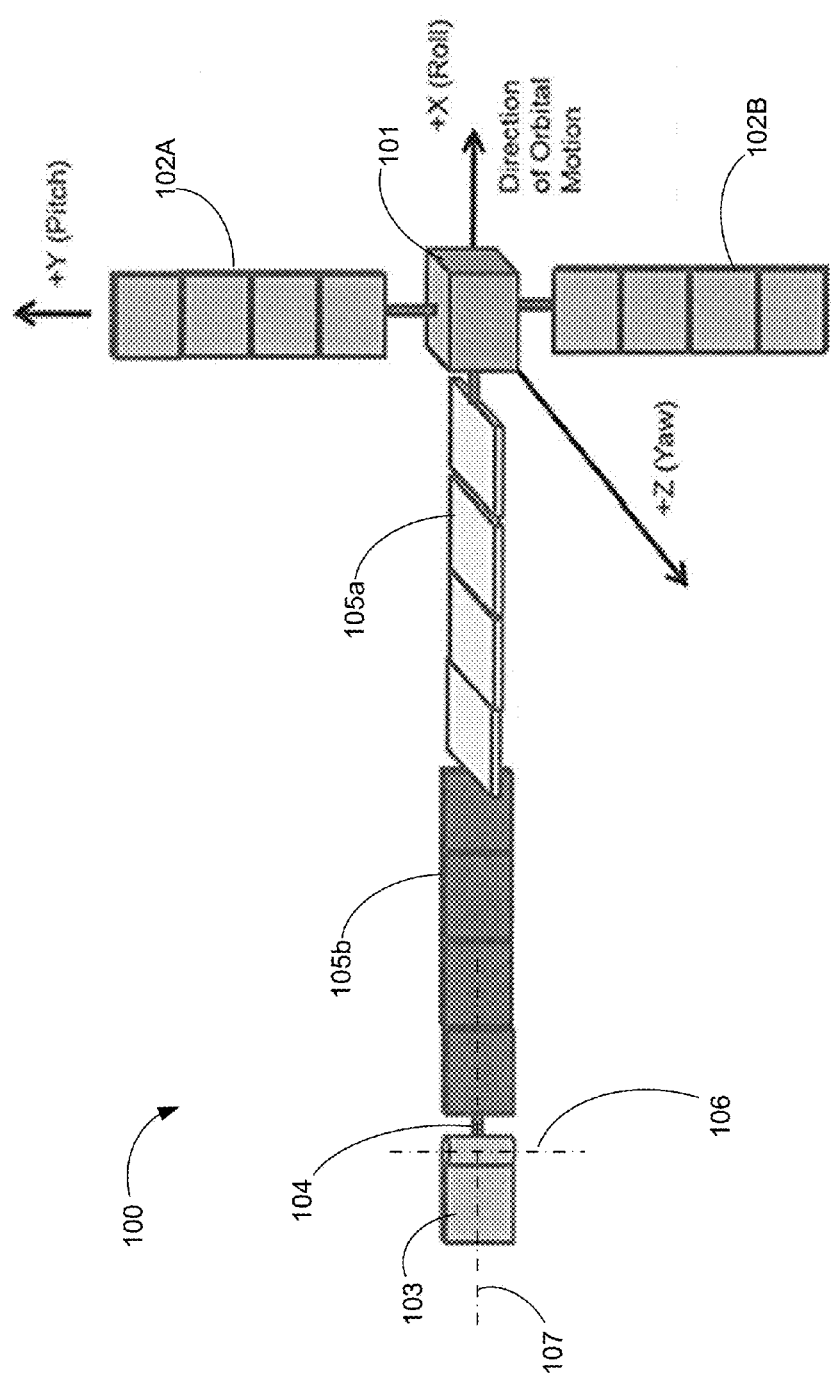
FIG. 2 illustrates a perspective view of a spacecraft in an on-orbit configuration according to another implementation.

Referring now to FIG. 2, in some implementation, the deployed array 105 may include both a thermal radiating array 105a and a solar array 105b. In the illustrated implementation, the orientation of the thermal radiator 105a may be adjusted such that it remains substantially edge-on with respect to the sun, whereas the orientation of the solar array 105A may be adjusted such that a photovoltaic power generating surface of the solar array 105B remains substantially sun facing.

Figure 3:
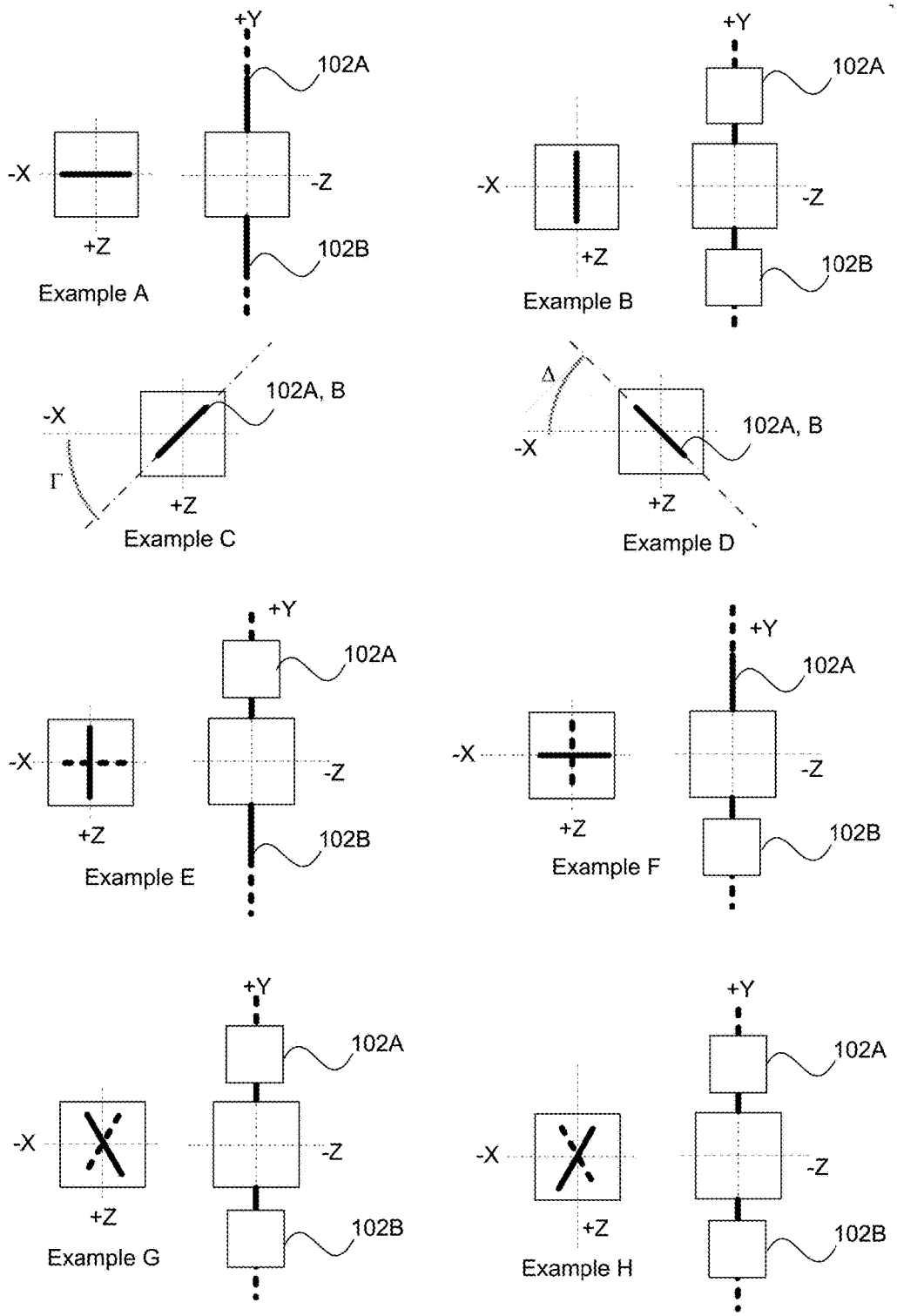
FIG. 3 illustrates examples of how aerodynamic control surfaces may be disposed with regard to particular objectives of one or more of regulating drag and controlling roll and/or yaw torques.

FIG. 3 illustrates examples of how the aerodynamic control surface 102A and 102B may be disposed with regard to particular objectives of one or more of regulating drag and controlling roll and/or yaw torques. In each example, a diagrammatic view is provided representing an angle of attack of the respective aerodynamic control surfaces 102A and 102B as viewed by looking along the pitch axis (left hand view) and along the roll axis (right hand view).

Referring first to Example A, the control surfaces 102A and 102B are shown to be disposed so as to present an angle of attack with respect to the spacecraft's direction of motion such that aerodynamic drag is minimized. More particularly, each of the control surfaces 102A and 102B is disposed such that a normal to the control surface is substantially orthogonal to the spacecraft's direction of motion. As a result, a minimal surface area of the control surfaces 102A and 102B is exposed to aerodynamic drag effects.

Referring next to Example B, the control surfaces 102A and 102B are shown to be disposed so as to present an angle of attack with respect to the spacecraft's direction of motion such that aerodynamic drag is maximized. More particularly, each of the control surfaces 102A and 102B is disposed such that a normal to the control surface is substantially parallel to the spacecraft's direction of motion. As a result, a maximal surface area of the control surfaces 102A and 102B is exposed aerodynamic drag effects.

It will be appreciated that Example A and Example B, illustrate respective extreme cases of minimizing (or maximizing) aerodynamic drag effects by minimizing (or maximizing) an effective surface area of the control surfaces 102A and 102B. Intermediate cases, in which the control surfaces 102A and 102B disposed at an angle intermediate to the examples illustrated by Example A and Example B, are illustrated in Example C and Example D. As a result, the presently disclosed techniques enable a fine degree of control of drag and therefore orbital velocity and altitude.

Where the control surfaces 102A and 102B are as illustrated in Example C and Example D a modest "lift" force will be experienced in the direction of the yaw (Z) axis. More particularly, in Example C, a lifting force in the −Z (anti-nadir) direction will be experienced; in Example D, a lifting force in the +Z (nadir) direction will be experienced. The effects of the lifting force may be substantially eliminated, if desired, by periodically reconfiguring the control surfaces 102A and 102B between, for example, the configuration illustrated in Example C and the configuration illustrated in Example D. For example, the control surfaces may be maintained in the configuration illustrated in Example C for a first period of time (e.g., one orbital revolution) and then switched to the configuration illustrated in Example D for a second period of time. In some implementations, the first period of time may not be equal to the second period of time. Nor is it necessary that the lifting force in the −Z direction necessarily be similar to the lifting force in the +Z (nadir) direction. For example, angle F of Example C may not have the same value as angle A of Example D.

The effect of aerodynamic drag on orbital velocity may be modeled as a function of a ratio of effective surface area to spacecraft mass. In some implementations, the disclosed techniques permit varying the ratio of effective surface area to spacecraft mass within a range from about 0.001 square meters per kilogram to about 0.003 square meters per kilogram. The present inventor has estimated that for a 500 km altitude orbit, a rate of decay in orbital altitude corresponding to a 0.001 square meters per kilogram ratio of effective surface area to spacecraft mass is about 4 m per day. For the same orbit, the rate of decay in orbital altitude corresponding to a 0.003 square meters per kilogram ratio of effective surface area to spacecraft mass is about 12 m per day and the rate of decay in orbital altitude corresponding to an intermediate ratio of 0.003 square meters per kilogram is about 8 m per day.

Example A through Example D each illustrate a configuration in which control surfaces 102A and 102B are each disposed so as to present a similar angle of attack with respect to the spacecraft's direction of velocity and may each, accordingly, produce an approximately equal amount of drag force. As a result, disturbance torques about the Z-axis may be immaterial.

Referring now to Example E, the control surfaces 102A and 102B are shown to be disposed so as to present a respectively different angle of attack with respect to the spacecraft's direction of motion such that aerodynamic drag produces a substantial torque about the z-axis. More particularly, the control surface 102A is disposed such that a normal to the control surface 102A is substantially parallel to the spacecraft's direction of motion, whereas control surface 102B is disposed such that a normal to the control surface 102B is substantially orthogonal to the spacecraft's direction of motion. As a result, a maximal surface area of the control surface 102A is exposed to aerodynamic drag effects, whereas a minimal surface area of the control surface 102B is exposed to aerodynamic drag effects. In the configuration of Example E, therefore, a substantial positive yaw torque may be developed.

Referring now to Example F, the control surface 102B is disposed such that a normal to the control surface 102B is substantially parallel to the spacecraft's direction of motion, whereas control surface 102A is disposed such that a normal to the control surface 102A is substantially orthogonal to the spacecraft's direction of motion. As a result, a maximal surface area of the control surface 102B is exposed to aerodynamic drag effects, whereas a minimal surface area of the control surface 102A is exposed to aerodynamic drag effects. In the configuration of Example F, therefore, a substantial negative yaw torque may be developed.

Referring next to Examples G and H, the control surfaces 102A and 102B are shown to be disposed so as to present an angle of attack with respect to the spacecraft's direction of motion such that a substantial torque (that may be analogized to a "windmill" torque) is developed about the roll axis. Put simply, the control surfaces 102A and 102B may function in a similar fashion as ailerons on an aircraft. For example, where each of the control surfaces 102A and 102B are disposed such that a respective normal to each control surface lies at an equal and opposite angle to the spacecraft's direction of motion approximately pure roll torque may be developed. In the configuration shown in Example G, a positive roll torque is developed, whereas in the configuration shown in Example H, a negative roll torque is developed.

Figure 4:
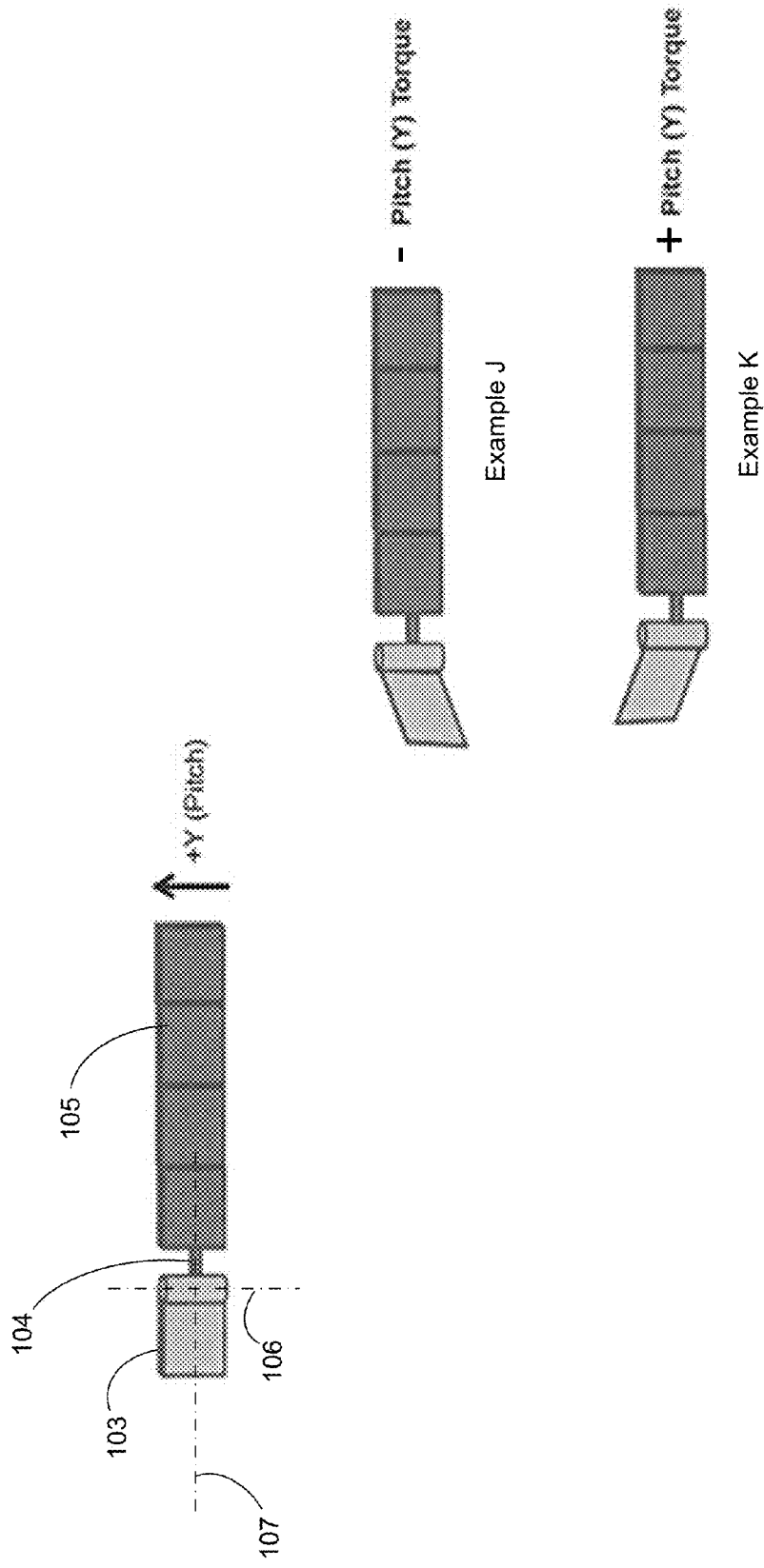
FIG. 4 illustrates examples of how the aerodynamic control surface 103 may be disposed with regard to particular objectives of controlling pitch torques.

FIG. 4 illustrates examples of how the aerodynamic control surface 103 may be disposed with regard to particular objectives of controlling pitch torques. As described hereinabove, an aft portion of the planar array 105 may be coupled with the boom 104, the boom 104 being in turn structurally coupled with the control surface 103. The planar array 105 may be rotatable about the longitudinal axis 107, in order to achieve or maintain a desired attitude with respect to, for example, the sun. In some implementations, the boom 104 includes or is coupled with a rotating positioner such that the axis 106 may be maintained in a desired orientation irrespective of rotation of the planar array 105 about axis 107. For example, the axis 106 may be maintained in an orientation parallel to the spacecraft pitch axis. As a result, articulating the control surface 103 about the axis 106 may provide a readily controllable amount of pitch torque. In the configuration illustrated by Example J, the control service 103 is articulated so as to provide a negative pitch torque. In the configuration illustrated by example K, the control service 103 is articulated so as to provide a positive pitch torque.

In some implementations, one or more of the control surfaces 102A,102B and 103 are mechanically coupled with the spacecraft using single-axis positioning mechanisms that permit rotation. In some implementations rotation of ±180° is contemplated irrespective of whether the single-axis positioning mechanisms are capable of continuous rotation in a single direction.

Thus, the presently disclosed techniques enable three-axis (roll, pitch, yaw) control of a spacecraft. As a result, an earth-facing payload of the spacecraft may be maintained in a nadir-pointing direction, or at a selected angular offset from nadir pointing, or at a fixed position on the earth, without expenditure of propellant. In some implementations the spacecraft is configured to avoid the use of or exclude propulsion equipment, momentum storage devices such as reaction or momentum wheels, and magnetic torquers. As a result, a substantial savings in mass and cost of the spacecraft may be obtained.

In some implementations, spacecraft orbital parameters may be adjusted by articulating the aerodynamic control surfaces 102A and 102B so as to vary aerodynamic drag effects. Changing the spacecraft orbital parameters may amount to undertaking maneuvers, including flying in formation with other spacecraft, such that a relative position of two or more spacecraft is tightly controlled. For example, drag forces may be used to maintain a spacecraft in a formation without the use of propulsion or solar radiation pressure. The spacecraft would nominally operate with the control surfaces 102A and 102B arranged to provide an intermediate amount of drag (e.g., configured as shown in Example C or D of FIG. 2). If solar radiation pressure or another force caused the spacecraft to depart from its assigned station within the formation, the drag force could be incremented upward or downward from the intermediate amount, by appropriately adjusting the angle of attack of the control surfaces 102A and 102B. Similarly, to the extent that drag variations resulting from roll/pitch/yaw control cause a difference in effective drag between two spacecraft flying in formation, appropriately adjusting the angle of attack of the control surfaces 102A and 102B can compensate for that difference.

This method would also be used to adjust the position of a spacecraft within the formation, for example to replace another spacecraft that is being taken out of service. Where a larger orbit modification is desired, use of a large drag chute or parachute may be contemplated. In such implementations, the drag chute may be jettisoned or restowed after the orbit modification. Single or multiple drag chutes may be employed.

Figure 5:
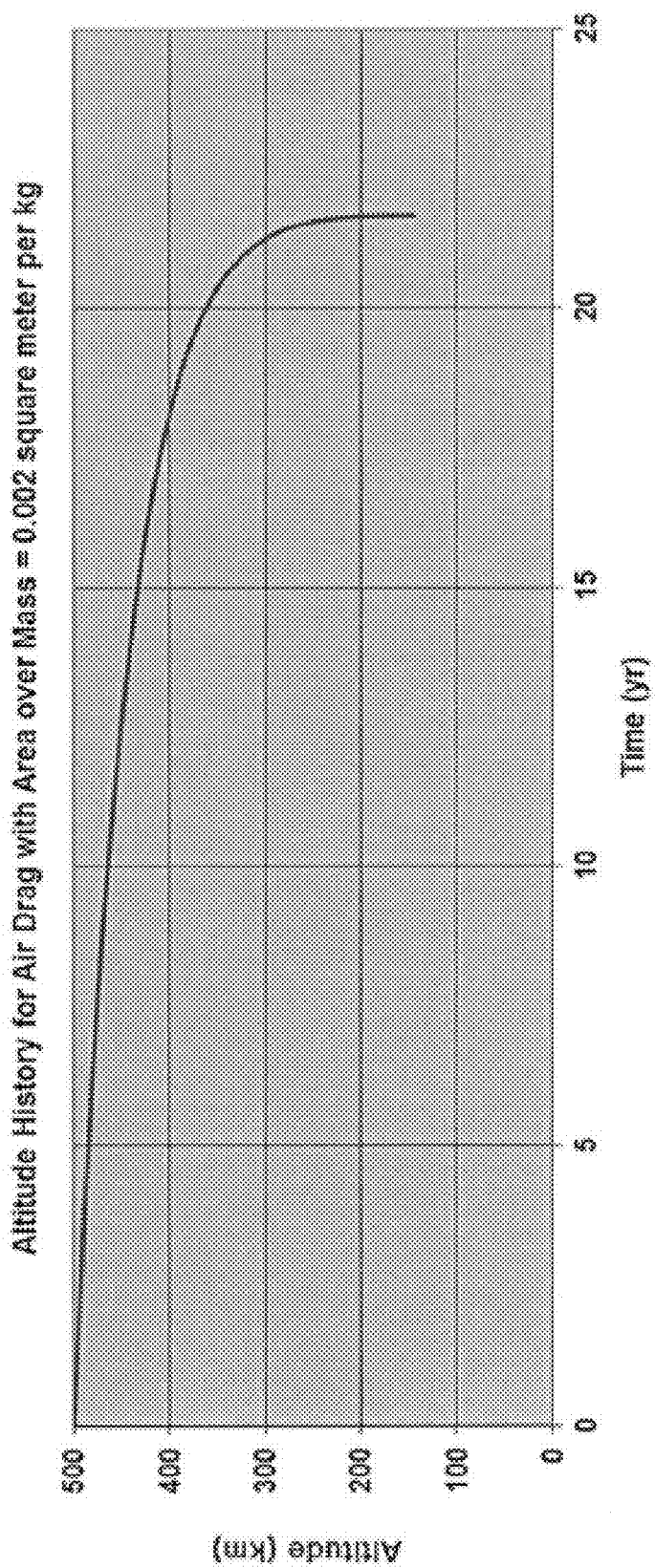
FIG. 5 illustrates spacecraft altitude as a function of time according to an implementation

By deliberately increasing aerodynamic drag near or after the end of the spacecraft's useful mission, compliance with U.S. Government space debris mitigation regulations may be obtained. For example, present regulations require that LEO spacecraft enter the atmosphere within 25 years after the end of mission life. Referring now to FIG. 5, results of analysis of spacecraft altitude as a function of time is presented. For a spacecraft initially at a LEO altitude of 500 km, and a ratio of effective surface area to spacecraft mass of 0.002 square meters per kilogram, reentry of the spacecraft into the earth's atmosphere occurs within about 22 years. As discussed hereinabove the presently disclosed techniques permit varying the ratio of effective surface area to spacecraft mass within a range from about 0.001 square meters per kilogram to about 0.002 square meters per kilogram.

Thus, even in the absence of any expenditure of propellant, a reasonably long mission life of 10 to 15 years may be obtained while still complying with Government space debris mitigation regulations.

Figure 6:
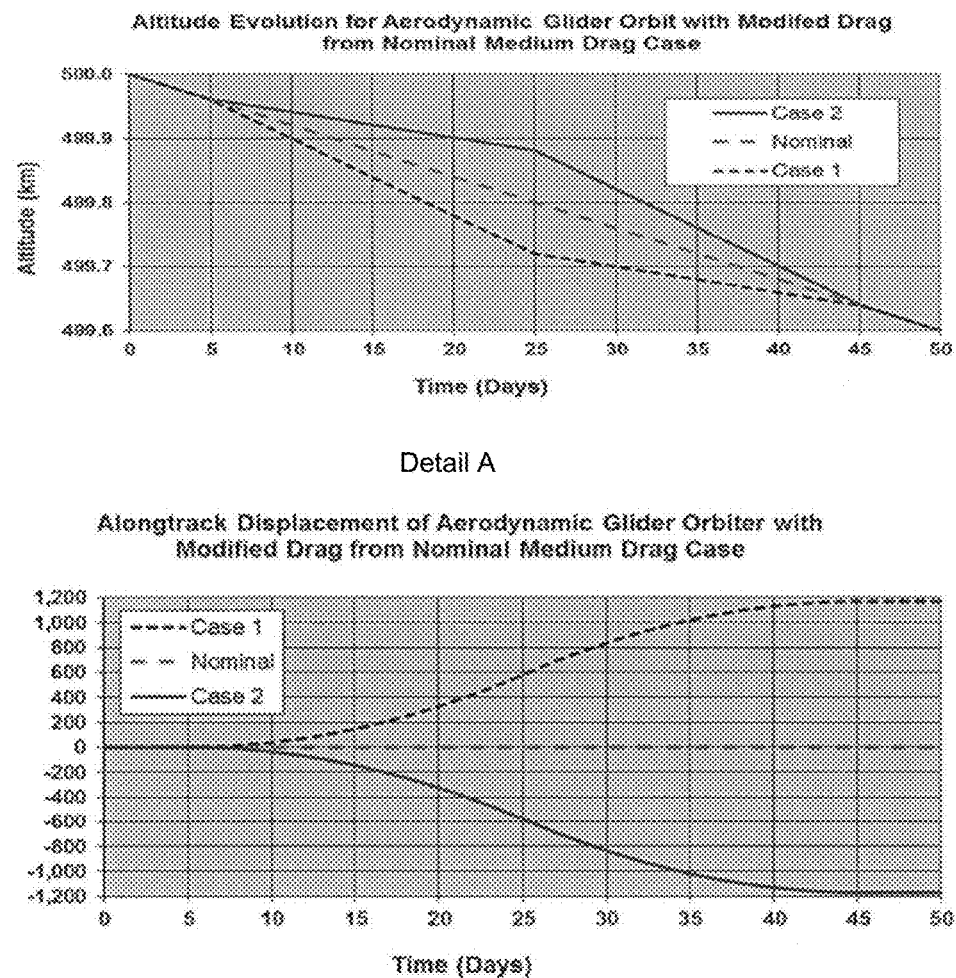
FIG. 6 illustrates an example method of controlling spacecraft attitude and or orbital velocity.

It is contemplated that the presently disclosed techniques may be used to provide for stationkeeping of a spacecraft relative to one or more other spacecraft operating in a common orbit plane. Referring to FIG. 6, Detail A illustrates how a rate of decay in spacecraft altitude may be regulated by varying the ratio of effective surface area to spacecraft mass. In the "Nominal Case", a medium amount of drag is applied throughout the illustrated time period of 50 days. For example, the control surfaces 102A and 102B may be disposed so as to present an angle of attack with respect to the spacecraft's direction of motion such that the effective surface area to spacecraft mass is about 0.003 square meters per kilogram.

In "Case 1" an increased amount of drag is applied from Day 5 to Day 25, and a decreased amount of drag is applied from Day 25 to Day 45. For example, at Day 5, the control surfaces 102A and 102B may be reconfigured from an angle of attack providing an effective surface area to spacecraft mass of about 0.002 $m^2$/kg ("nominal drag", corresponding to Examples C or D of FIG. 2) to an angle of attack providing an effective surface area to spacecraft mass of about 0.003 $m^2$/kg ("increased drag", corresponding to Example B of FIG. 2). At Day 25, the control surfaces 102A and 102B may be reconfigured to an angle of attack providing an effective surface area to spacecraft mass of about 0.001 $m^2$/kg ("reduced drag", corresponding to Example A of FIG. 2). At Day 45, the control surfaces 102A and 102B may be reconfigured to the nominal drag angle of attack. In case 2, the control surfaces 102A and 102B are configured to provide reduced drag from Day 5 to Day 25, increased drag from Day 25 to Day 45 and nominal drag at other times. This enables the rate of altitude decay to temporarily depart from the nominal case value.

Detail B illustrates "along-track displacement" as a function of time corresponding altitude plots illustrated in Detail A, where along track displacement refers to a displacement along the spacecraft's orbital track from a nominal position, the nominal position being that which corresponds to the nominal drag case. Thus, the along track displacement may be readily controlled by a temporary increase or decrease of drag from a nominal value. As a result, a separation distance between satellites in a common orbit may be closely controlled using non-propulsive means.

Figure 7:
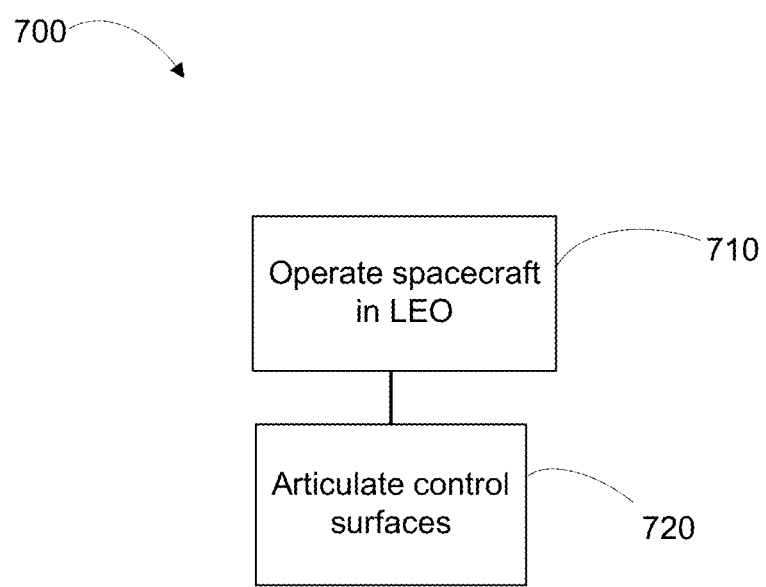
FIG. 7 illustrates an example block diagram of a spacecraft according to some implementations.

Referring now to FIG. 7, a method 700 of controlling spacecraft attitude and or orbital velocity will be described. Advantageously the method may be executed while avoiding use of propulsion subsystem equipment, momentum storage equipment, and magnetic torquers. Indeed in some implementations the spacecraft may be configured to exclude such equipment. At block 710, a spacecraft may be operated in LEO. More particularly the orbit may an altitude in the range of 160 to 800 km.

At block 720 control surfaces may be articulated whereby aerodynamic drag effects are used to provide three-axis attitude control to the spacecraft to control one or both of orbital altitude and period. Advantageously, a main body of the spacecraft, having an earth-facing payload, may be three-axis controlled such that the earth-facing payload is maintained in a selected orientation respect to the earth (e.g., nadir facing, a selected angular offset from nadir facing, or directed at a fixed location on the earth's surface).

Figure 8:
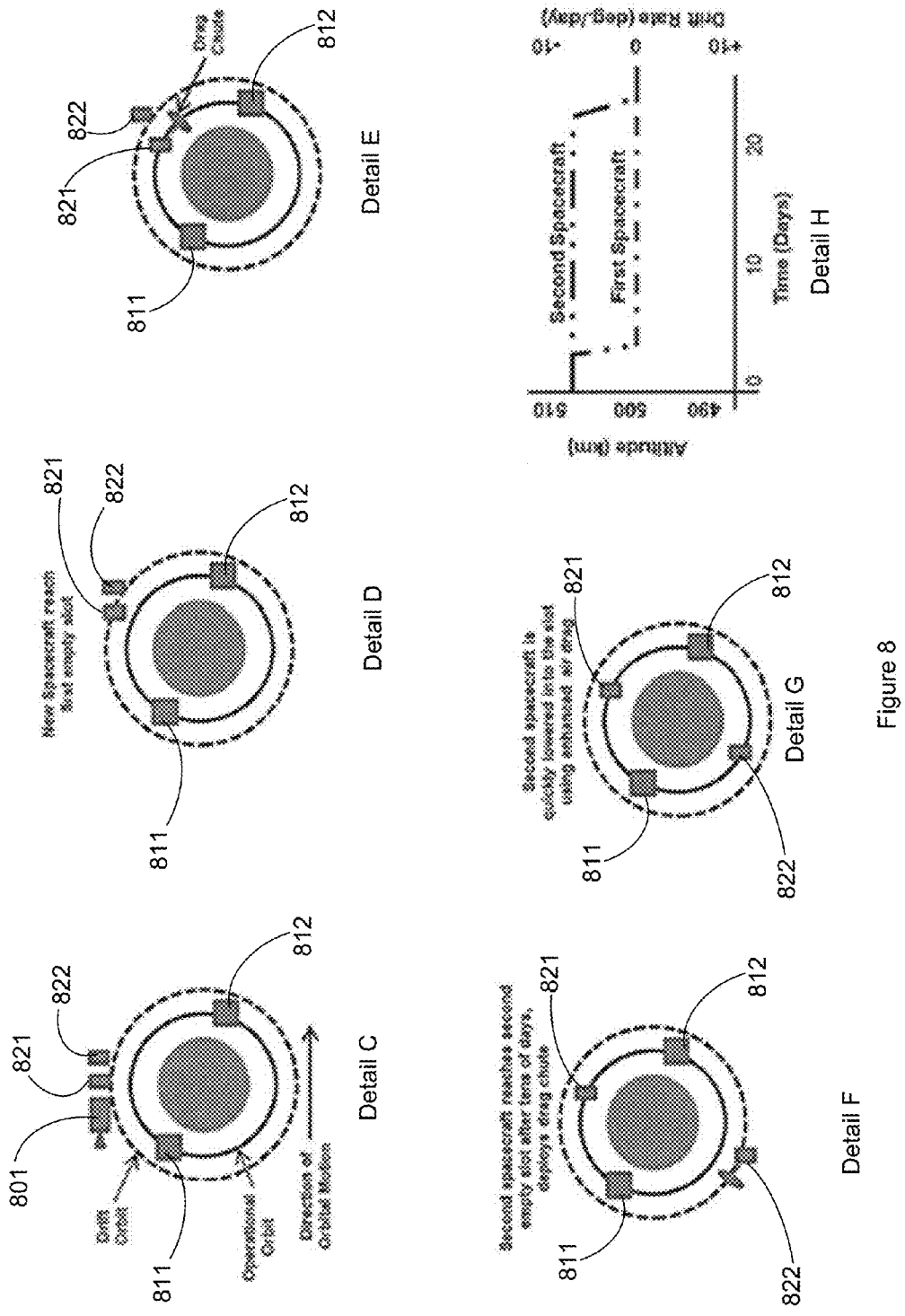
FIG. 8 illustrates an example of using non-propulsive means to add additional spacecraft to an already partially populated orbital.

In some implementations aerodynamic drag forces may be utilized for populating an orbit plane with a constellation of spacecraft. FIG. 8 illustrates an example of using non-propulsive means to add additional spacecraft to an already partially populated orbital according to a timeline illustrated in Detail H. At Day 0, two additional spacecraft 821 and 822, launched from a common launch vehicle, are separated from launch vehicle upper stage 801 in a higher altitude drift orbit. The drift orbit may be in a common plane with the operational orbit in which two spacecraft 811 and 812 are already disposed and may have a longer orbital period than the operational orbit. As a result, relative drift in angular position of a spacecraft in the drift orbit will be experienced compared to the spacecraft in the operational orbit. For example, where the operational orbit is at 500 km altitude, the drift orbit may be at approximately 508 km and spacecraft 821 and 822 will revolve 360° around earth relative to spacecraft 811 and 812 in about 40 days.

At approximately Day 4 in the illustrated example, spacecraft 821 and 822 have drifted to an orbital angular position proximate to a "first empty slot" in the operational orbit into which it is desired to place a first one of the spacecraft 821 and 822.

It will be appreciated that air drag effects on the spacecraft 821 and 822 spacecraft are similar to those on the, spacecraft 811 and 812 because the difference in altitude of the drift orbit and the operational orbit is not large. So, for example all four spacecraft may experience a decay rate in altitude of about 8 m per day.

Referring now to Detail E, in order to insert the spacecraft 821 into the first empty slot, a drag chute is deployed at Day 4. The drag chute may substantially increase the effect of aerodynamic drag experienced by the spacecraft 821. As a result, the rate of orbital altitude decay may be significantly increased. In some implementations, the drag chute may be configured such that the altitude decay rate is increased to 8 km per day. The present inventor has estimated that, to achieve an 8 km per day altitude decay rate, the deployed drag chute may be configured to provide an effective area-to-mass ratio of the spacecraft of about 2 square meters per kg.

Thus the deployed drag chute enables inserting the spacecraft 821 into the operational orbit within about one day. Once the spacecraft 821 has achieved the operational orbit altitude the drag chute may be re-stowed or jettisoned.

At approximately Day 24 in the illustrated example, spacecraft 822 has drifted to an orbital angular position proximate to a "second empty slot" in the operational orbit. Similarly to the procedure described above a drag chute may be deployed spacecraft 822 so as to insert the spacecraft 822 into the operational orbit. Thus, as illustrated in Detail G the operational orbit may be populated by spacecraft spaced substantially equidistantly in the orbital plane.

Figure 9:
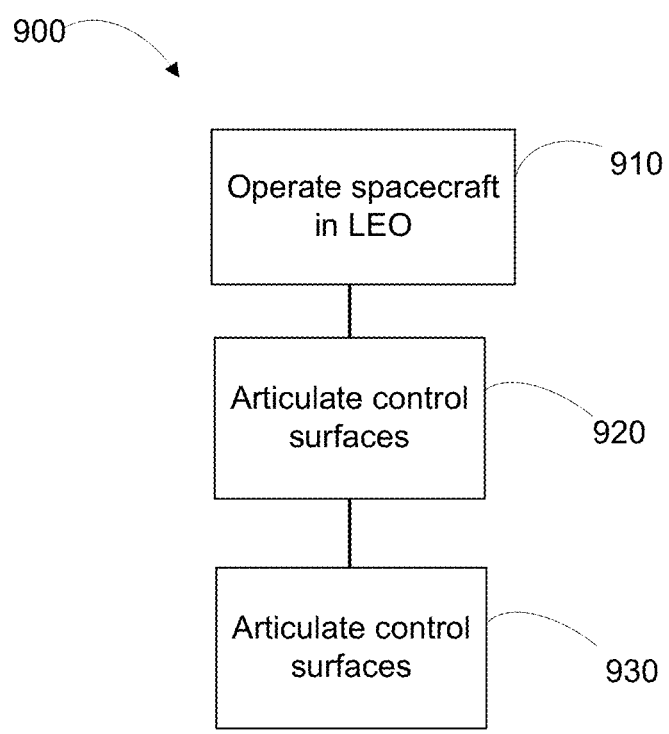
FIG. 9 illustrates a method 900 of populating a constellation of satellites, according to an implementation.

Referring now to FIG. 9, a method 900 of populating a constellation of satellites will be described. Advantageously the method may be executed while avoiding use of propulsion subsystem equipment, momentum storage equipment, and magnetic torquers. Indeed, in some implementations the spacecraft may be configured to exclude such equipment. At block 910, a first spacecraft may be operated in a first low earth orbit. At block 920, a second spacecraft may be operated in a second low earth orbit. Each of the first low earth orbit and the second low earth orbit may have a respective characteristic altitude. Advantageously the second low earth orbit may have a characteristic altitude that is higher than the characteristic altitude of the second low earth orbit. The second spacecraft may have been placed in the second low earth orbit by direct injection by a launch vehicle.

At block 930 the second spacecraft may be transferred from the second low earth orbit to the first low earth orbit. As described hereinabove, transferring the second spacecraft from the second low earth orbit to the first low earth orbit may include deploying a drag chute from the second spacecraft following a selected period of relative drift between the first spacecraft and the second spacecraft. As a result the second spacecraft may arrive in the low earth orbit at a desired angular separation from the first spacecraft.

Thus, satellite attitude and orbit control techniques, suitable for use by a satellite operating in a low earth orbit have been disclosed. The foregoing merely illustrates principles of the invention. It will thus be appreciated that those skilled in the art will be able to devise numerous systems and methods which, although not explicitly shown or described herein, embody said principles of the invention and are thus within the spirit and scope of the invention as defined by the following claims.

What is claimed is:

1. A method comprising:
    operating a spacecraft in a low earth orbit having an altitude in the range of 160 to 800 km, the spacecraft having a main body that includes heat dissipating electrical equipment and an earth-facing payload;
    articulating control surfaces so as to:
    provide three-axis attitude control to the spacecraft main body using aerodynamic drag effects, such that the earth-facing payload is maintained in a selected orientation with respect to the earth; and
    control one or both of orbit altitude and period by articulating the control surfaces so as to regulate an amount of aerodynamic drag; wherein:
    the control surfaces include a first control surface disposed, in an on-orbit configuration, on a boom, a first portion of the boom being mechanically coupled with the main body, and a second portion of the boom being mechanically coupled with one or both of a solar array that is electrically coupled with the electrical equipment and a thermal radiating array that is thermally coupled with the electrical equipment; and
    a longitudinal axis of the boom approximately coincides with a roll axis of the spacecraft.

2. The method of claim 1, wherein the thermal radiating array is configured to radiate waste heat to space.

3. The method of claim 1, wherein the spacecraft is an unmanned communications or observation satellite.

4. The method of claim 3, wherein the spacecraft has a power to mass ratio of at least 10 W/kg.

5. The method of claim 1, wherein the first control surface is configured to provide a variable amount of pitch torque and the control surfaces include a second control surface and a third control surface, each of the second control surface and the third control surface being disposed in an on orbit configuration so as to provide a variable amount of one or both of roll and yaw torque.

6. The method of claim 5, wherein controlling one or both of orbit altitude and period by articulating the control surfaces includes articulating the second control surface and the third control surface so as to adjust orbital velocity.

7. The method of claim 5, wherein articulating the control surfaces includes regulating the amount of aerodynamic drag to be substantially constant.

8. The method of claim 1, further comprising controlling one or both of orbit altitude and period by deploying a drag chute.

9. The method of claim 8, further comprising jettisoning or restowing the drag chute.

10. The method of claim 1, wherein the spacecraft is configured to exclude propulsion subsystem equipment, momentum storage equipment, and magnetic torquers.

11. The method of claim 1, wherein the selected orientation is nadir pointed, a selected angular offset with respect to nadir pointed, or toward a fixed location on the earth.

12. The method of claim 1, wherein the control surfaces are configured to regulate aerodynamic drag so as to maintain the spacecraft in a desired position with respect to one or more other spacecraft in a constellation.

13. The method of claim 12, further comprising:
    maintaining the spacecraft in a desired position with respect to one or more other spacecraft in a constellation by adjusting an angle of attack of the control surfaces such that an amount of aerodynamic drag is incremented upward or decremented downward from an intermediate amount.

14. The method of claim 1, further comprising configuring the control surfaces to increase drag so as to achieve a deorbiting objective.

15. The method of claim 14, wherein the deorbiting objective is to ensure that the spacecraft is deorbited within a selected timeframe.

16. The method of claim 1, wherein the control surfaces are configurable to vary the ratio of effective surface area to spacecraft mass within a range from about 0.001 square meters per kilogram to about 0.003 square meters per kilogram.

* * * * *